US008219899B2

(12) United States Patent
Basson et al.

(10) Patent No.: US 8,219,899 B2
(45) Date of Patent: Jul. 10, 2012

(54) VERBAL DESCRIPTION METHOD AND SYSTEM

(75) Inventors: Sara H. Basson, White Plains, NY (US); Brian Reginald Heasman, Oostduinkerke (BE); Dimitri Kanevsky, Ossining, NY (US); Edward Emile Kelley, Wappingers Falls, NY (US); Bhuvana Ramabhadran, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 12/235,064

(22) Filed: Sep. 22, 2008

(65) Prior Publication Data
US 2010/0073559 A1    Mar. 25, 2010

(51) Int. Cl.
G06F 17/00 (2006.01)
H04N 5/04 (2006.01)

(52) U.S. Cl. ........ 715/203; 715/205; 715/730; 715/760; 348/500; 348/512

(58) Field of Classification Search .................. 715/200, 715/201, 202, 203, 204, 205, 207, 208, 226, 715/231, 233, 234, 254, 255, 256, 273, 700, 715/727, 728, 729, 730, 738, 760, 761, 762, 715/763; 348/231.4, 500, 501, 508, 513, 348/515, 516, 521, 575, 639, 646, 647, 651
See application file for complete search history.

(56) References Cited

U.S. PATENT DOCUMENTS

| | | | |
|---|---|---|---|
| 5,890,117 A | | 3/1999 | Silverman |
| 6,446,040 B1 | | 9/2002 | Socher et al. |
| 6,493,872 B1 | * | 12/2002 | Rangan et al. .................. 725/32 |
| 6,636,888 B1 | * | 10/2003 | Bookspan et al. ............ 709/203 |
| 6,760,408 B2 | * | 7/2004 | Crosson et al. .................. 379/52 |
| 7,030,930 B2 | * | 4/2006 | Kovacevic ..................... 348/515 |
| 7,103,551 B2 | | 9/2006 | King et al. |
| 7,406,657 B1 | * | 7/2008 | Callaghan et al. ............. 715/225 |
| 7,913,155 B2 | * | 3/2011 | Basson et al. .................. 715/203 |
| 2002/0055950 A1 | * | 5/2002 | Witteman ................... 707/500.1 |
| 2002/0178007 A1 | * | 11/2002 | Slotznick et al. ........... 704/270.1 |
| 2003/0088613 A1 | | 5/2003 | Goldschmidt Iki et al. |
| 2007/0277092 A1 | * | 11/2007 | Basson et al. .................. 715/512 |
| 2009/0313015 A1 | * | 12/2009 | Basson et al. .................. 704/236 |

OTHER PUBLICATIONS

Burmeister; Requirements of Deaf User of Information Visualization an Interdisciplinary Approach; 2003 IEEE Computer Society; Proceedings of the Seventh International Conference on Information Visualization (IV'03); pp. 433-438.

Watanabe et al.; Speech Visualization by Integrating Features for the Hearing Impaired; IEEE Transactions on Speech and Audio Processing, vol. 8, No. 4, Jul. 2000; pp. 454-466.

\* cited by examiner

*Primary Examiner* — Maikhanh Nguyen
(74) *Attorney, Agent, or Firm* — Schmeiser, Olsen & Watts; John Pivnichny

(57) ABSTRACT

A verbal description method and system. A computing system broadcasts first audio data and video data associated with the first audio data. The computing system determines that the video data comprises a graphic without a description in the first audio data. The computing system receives audible description data associated with the graphic. The computing system generates second audio data comprising the first audio data and the audible description data. The computing system synchronizes portions of the second audio data with associated portions of the video data. The computing system generates synchronized audio/video data comprising the portions of said second audio data aligned with the associated portions of said video data. The computing system broadcasts the synchronized audio/video data.

16 Claims, 4 Drawing Sheets

ND SYSTEM

FIELD OF THE INVENTION

The present invention relates to a method and associated system for generating and parsing verbal and/or text descriptions for specific graphics within video data.

BACKGROUND OF THE INVENTION

Generating specified data typically comprises an inefficient process with little flexibility. Accordingly, there exists a need in the art to overcome the deficiencies and limitations described herein above.

SUMMARY OF THE INVENTION

The present invention provides a method, comprising:
broadcasting, by a computing system, first audio data;
broadcasting, by said computing system, first video data associated with said first audio data, wherein said first audio data comprises audible descriptions for portions of said first video data;
determining, by said computing system, that said first video data comprises a first graphic, wherein said first audio data does not comprise a description associated with said first graphic;
after said determining, disabling by said computing system, said broadcasting first audio data and said broadcasting said first video data;
after said disabling, receiving by said computing system, audible description data associated with said first graphic;
generating, by said computing system, second audio data comprising said first audio data and said audible description data, wherein said generating said second audio data comprises inserting said audible description data into an associated portion of said first audio data;
synchronizing, by said computing system, portions of said second audio data with associated portions of said first video data;
generating, by said computing system in response to said synchronizing, synchronized audio/video data comprising said portions of said second audio data aligned with said associated portions of said first video data; and
broadcasting, by said computing system, said synchronized audio/video data.

The present invention provides a computing system comprising a processor coupled to a computer-readable memory unit, said memory unit comprising instructions that when executed by the processor implements a verbal description method, said method comprising;
broadcasting, by said computing system, first audio data;
broadcasting, by said computing system, first video data associated with said first audio data, wherein said first audio data comprises audible descriptions for portions of said first video data;
determining, by said computing system, that said first video data comprises a first graphic, wherein said first audio data does not comprise a description associated with said first graphic;
after said determining, disabling by said computing system, said broadcasting first audio data and said broadcasting said first video data;
after said disabling, receiving by said computing system, audible description data associated with said first graphic;
generating, by said computing system, second audio data comprising said first audio data and said audible description data, wherein said generating said second audio data comprises inserting said audible description data into an associated portion of said first audio data;
synchronizing, by said computing system, portions of said second audio data with associated portions of said first video data;
generating, by said computing system in response to said synchronizing, synchronized audio/video data comprising said portions of said second audio data aligned with said associated portions of said first video data; and
broadcasting, by said computing system, said synchronized audio/video data.

The present invention advantageously provides a system and associated method capable of generating specified data.

DETAILED DESCRIPTION OF THE INVENTION

Figure 1:
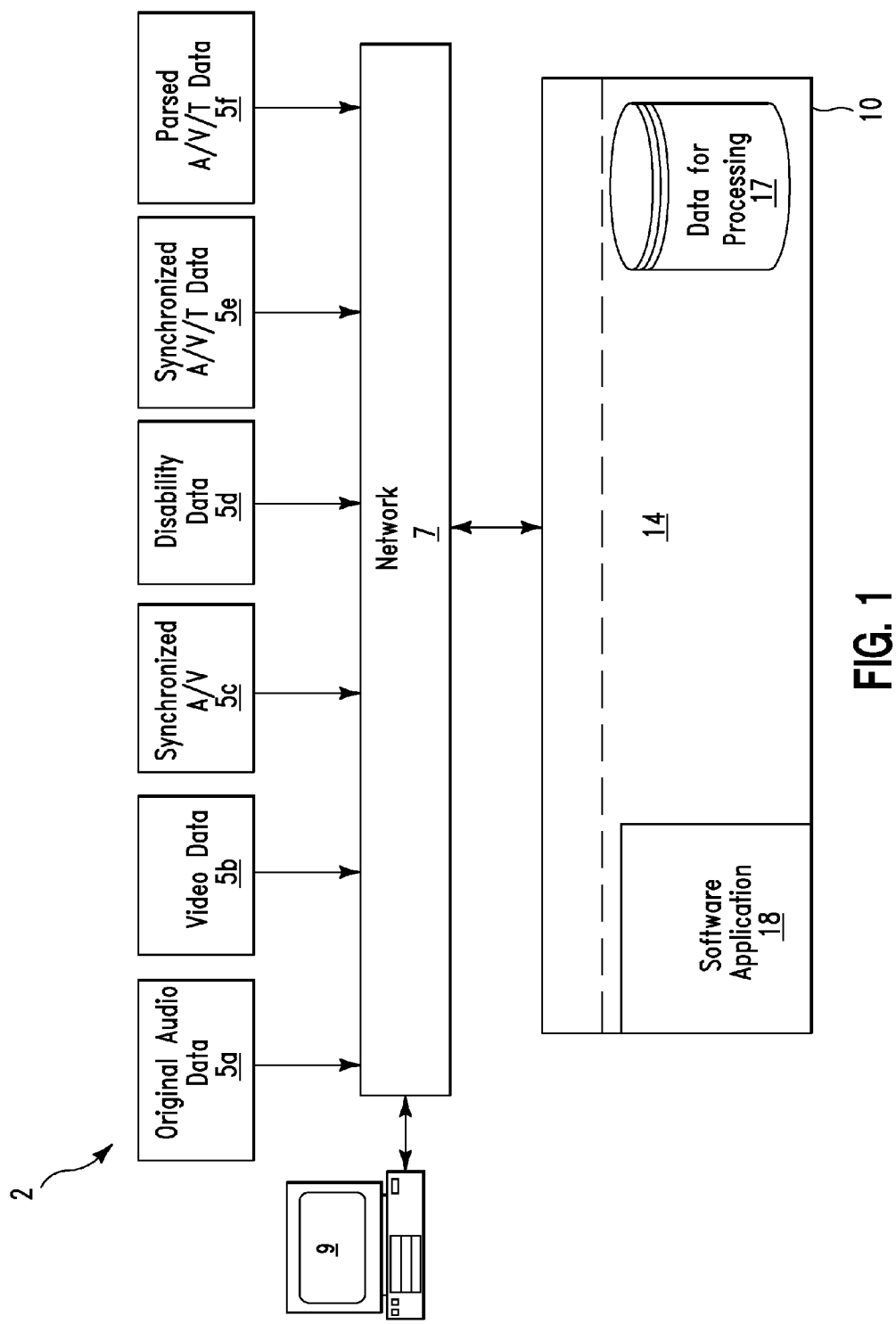
FIG. 1 illustrates a block diagram view of a system for generating additional verbal descriptions for specific graphics within video data, in accordance with embodiments of the present invention.

FIG. 1 illustrates a block diagram view of a system 2 for generating additional verbal descriptions for specific graphics within video data 5b, in accordance with embodiments of the present invention. The additional verbal descriptions for specific graphics within video data 5b may be generated so that a disabled audience or viewer (e.g., hearing impaired, visually impaired, etc) may better understand the specific graphics. For example, a slide show may comprise basic text or audio descriptions for each slide (e.g., a highway scene) but a specific graphic (e.g., an automobile) in a slide may not be adequately described (e.g., only referred to as an automobile). Therefore, system 2 will generate a detailed audio and/or text description for the automobile (e.g., the automobile is a red convertible of a specific model and brand) and add the detailed audio and/or text description for the automobile to an associated portion of the slide show. Additionally, system 2 performs a process for parsing the detailed audio or text description (or any audio or text description associated with an audio/video broadcast) for specified audiences dependent upon a type of disability that is associated with an audience (e.g., hearing impaired, visually impaired, etc). As a first example, if a standard slide show is converted for a hearing impaired audience, system 2 may remove an audio portion of the audio/video broadcast and only broadcast a video portion of the audio/video broadcast along with enhanced text descriptions for the video portion. As a second example, if a standard slide show is converted for a visually impaired audience, system 2 may remove an video portion of the audio/ video broadcast and only broadcast an audio portion (along with audio description enhancements to account for the missing video) of the audio/video broadcast.

System 2 of FIG. 1 comprises a computing apparatus 9, original audio data (file/stream) 5a, original video data (file/stream) 5b, synchronized audio/video data (file/stream) 5c, disabilities data 5d specifying audience disabilities, synchronized audio/video/text data (file/stream) 5e, and parsed audio, video, or text data (file/stream) 5f connected to a computing system 10 through a network 7. Alternatively, computing apparatus 9, original audio data (file/stream) 5a, original video data (file/stream) 5b, synchronized audio/video data (file/stream) 5c, disabilities data 5d specifying audience disabilities (i.e., in order to parse the detailed audio or text description (or any audio or text description associated with an audio/video broadcast) for specified audiences dependent upon a type of disability that is associated with an audience (e.g., hearing impaired, visually impaired, etc)), synchronized audio/video/text data (file/stream) 5e, and parsed audio, video, or text data (file/stream) 5f may be directly connected to computing system 10. Network 7 may comprise any type of network including, inter alia, a local area network, (LAN), a wide area network (WAN), the Internet, etc. Original audio data (file/stream) 5a, original video data (file/stream) 5b, synchronized audio/video data (file/stream) 5c, disabilities data 5d specifying audience disabilities, synchronized audio/video/text data (file/stream) 5e, and parsed audio, video, or text data (file/stream) 5f may each be comprised by a computer, a database, a repository, an audio and/or video player, etc. Computing apparatus 9 may be used by a speaker that is shadowing an original speaker in order to generate any of original audio data (file/stream) 5a, synchronized audio/video data (file/stream) 5c, synchronized audio/video/text data (file/stream) 5e, and parsed audio, video, or text data (file/stream) 5f. Shadowing is defined herein as a process performed by a person that listens to an original audio file or stream (e.g., original audio data (file/stream) 5a) and repeats speech data from the original audio file or stream. A shadowing process may be performed by a shadower (i.e., a person that performs a shadowing process) in order to generate a transcript of the speech data from the original audio file or stream. Additionally, a shadowing process may be performed in order to dub over the speech data (or a portion of the speech data) from the original audio file or stream for language translation or coherence (i.e., an original speaker is not coherent) purposes.

Computing apparatus 9 may comprise, inter alia, a personal computer, a laptop computer, a computer terminal, a telephone, etc. Computing apparatus 9 may comprise a single computing apparatus or a plurality of computing apparatuses. Computing system 10 may comprise any type of computing system(s) including, inter alia, a personal computer (PC), a server computer, a database computer, etc. Computing system 10 may comprise a single computing system or a plurality of computing systems. Computing system 10 comprises a memory system 14. Memory system 14 may comprise a single memory system. Alternatively, memory system 14 may comprise a plurality of memory systems. Memory system 14 may be internal to computing system (e.g., as illustrated in FIG. 1) or external to computing system 10. Memory system 14 comprises a software application 18 and repository 17. Repository 17 may be located internal to memory system 14 or external to memory system 14. Repository 17 may be a database. Repository 17 comprises audio/text/video data generated, synchronized, and/or parsed by software application 18. The following example illustrates a process used by software application 18 for generating and parsing verbal descriptions for specific graphics within video data (e.g., video data 5b):

1. Original audio data (e.g., original audio data 5a) associated with a slide presentation is broadcasted.
2. Original slides (e.g., original video data 5b) associated with the original audio data are broadcasted.
3. The presence of a picture or specified graphic (i.e., vs. bullets and text) on a slide is identified. The picture or specified graphic may be identified via an automated process (e.g., using software codes or through a shadower).
4. After the presence of a picture or specified graphic on a slide is identified, the original audio data is disabled or stopped (e.g., manually by a shadower or automatically using software codes)
5. The picture or specified graphic is described (e.g., by a shadower).
6. The description for the picture or specified graphic is extracted from the original audio data in order to parse out the description (or any audio or text description associated with an audio/video broadcast) for specified audiences dependent upon a type of disability that is associated with an audience (e.g., hearing impaired, visually impaired, etc) as described in steps 6a-6e.
   6a. A manual or automated process for identifying the description for the picture or specified graphic is performed. The manual process comprises manually marking (e.g., by a shadower) a portion of the audio to indicate that the portion of the audio comprises the description of the picture. The automated process comprises automatically detecting the difference between the new audio (i.e., the description for the picture) and the original audio by comparing the original audio to the shadowed audio and detecting additional text associated with the picture description.
   6b. The identified description for the picture or specified graphic is selected.
   6c. The identified description for the picture or specified graphic is extracted from the audio.
   6d. The remaining original audio (i.e., after the identified description for the picture or specified graphic is extracted) is smoothed so that the audio sounds contiguous with earlier shadowed audio. Techniques for smoothing the audio may include, inter alia, a concatenative speech synthesis process.
   6e. The extracted audio is synchronized with the visual information (i.e., an associated slide) thereby generating synchronized audio/video data (file/stream) 5c. The synchronizing may comprise using a manual method (e.g., a shadower enables a button) or a semi-automatic method (e.g., aligning with labels that are associated with the pictures).
7. A shadower then resumes shadowing and playing the original audio.

Figure 2:
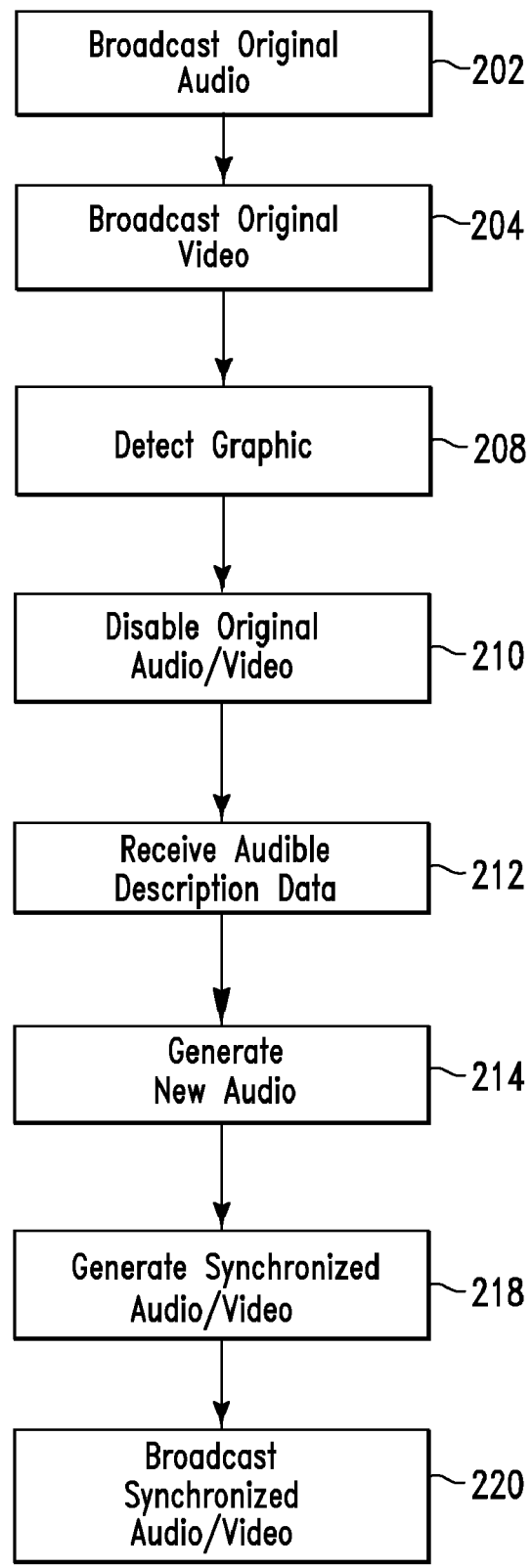
FIG. 2 illustrates an algorithm describing a process used by the system of FIG. 1 for generating detailed verbal descriptions for specific graphics within video data, in accordance with embodiments of the present invention.

FIG. 2 illustrates an algorithm describing a process used by system 2 of FIG. 1 for generating detailed verbal descriptions for specific graphics within video data, in accordance with embodiments of the present invention. In step 202, a computing system (or audio player) broadcasts original audio data. In step 204, the computing system (or a video player) broadcasts original video data (e.g., slides) associated with the original audio data. The original audio data comprises audible descriptions for portions of the video data. In step 208, the computing system detects a graphic in the video data that does not comprise a description in the original audio data. In step 210, the computing system disables the broadcasting of the original audio and video data. In step 212, the computing system receives or generates audible description data associated with (i.e., describing) the graphic. In step 214, the computing system generates updated audio data comprising the original audio data and the audible description data. The updated audio data is generated by inserting the audible description data into an associated portion of the first audio data. In step 218, the computing system generates synchronized audio/video data by synchronizing portions of the updated audio data with associated portions of the original video data. In step 220, the computing system broadcasts the synchronized audio/video data.

Figure 3:
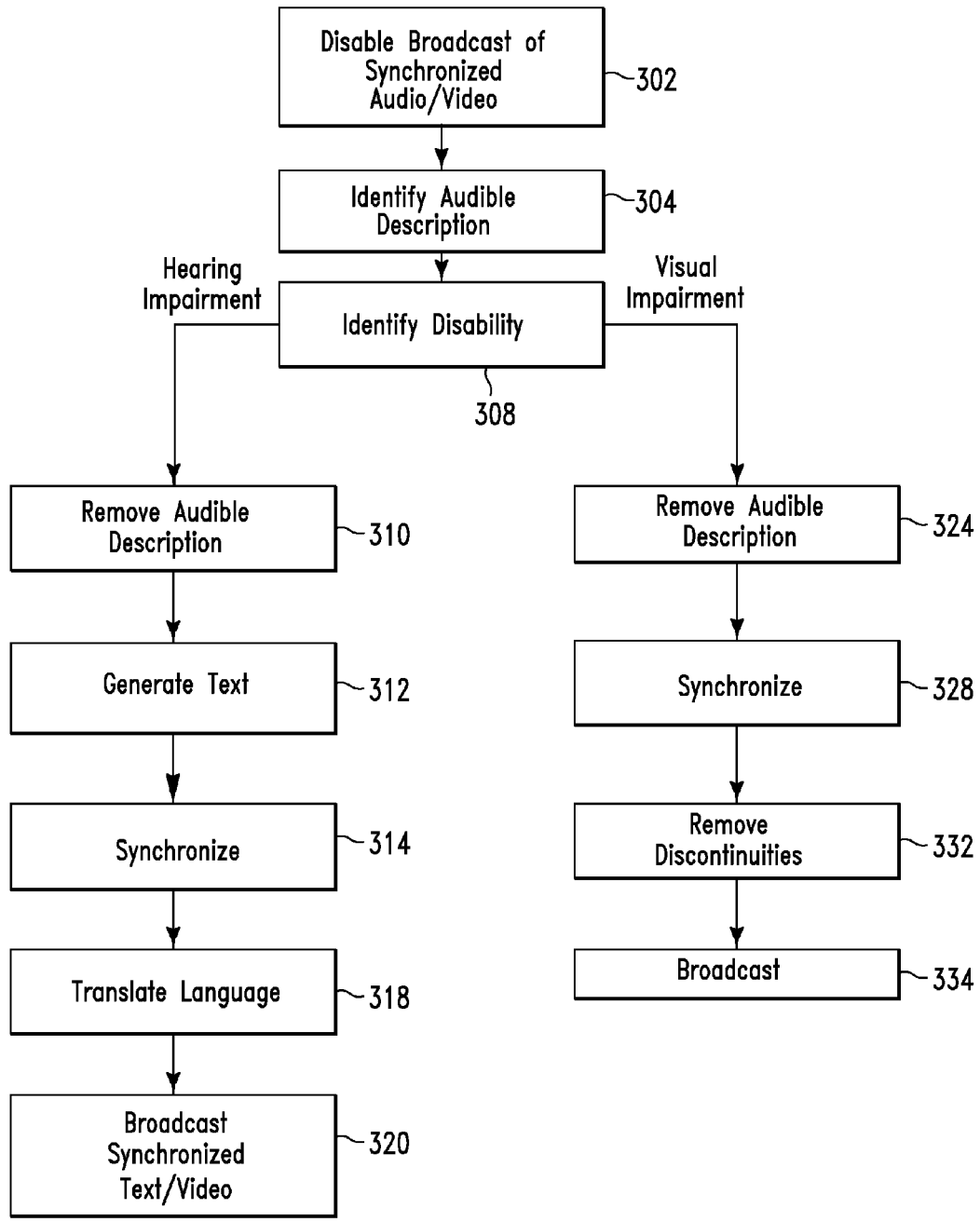
FIG. 3 illustrates an algorithm describing a process used by the system of FIG. 1 for parsing detailed audible or converted text description for specified audiences dependent upon a type of disability that is associated with an audience, in accordance with embodiments of the present invention.

FIG. 3 illustrates an algorithm describing a process used by system 2 of FIG. 1 for parsing detailed audible or converted text description (or any audio or text description associated with an audio/video broadcast) for specified audiences dependent upon a type of disability that is associated with an audience, in accordance with embodiments of the present invention. In step 302, a computing system disables a broadcast associated with synchronized audio/video data (i.e., the broadcast executed in step 220 of FIG. 2). In step 304, the computing system identifies the audible description data (i.e., received in step 212 of FIG. 2) within the synchronized audio/video data. In step 308, the computing system determines a specified disability type associated with an audience for the synchronized audio/video data. The specified disability type may be determined by analyzing disability data 5d of FIG. 1.

If in step 308, the computing system determines that the specified disability type comprises a hearing impairment disability then in step 310, the computing system removes the audible description data from the synchronized audio/video data. In step 312, the computing system generates text data from the audible description data. In step 314, the computing system synchronizes the text data with a graphic associated with the audible description data. In optional step 318, the text data may be translated into a different language (i.e., differing from an original language of the text data or the audible description data. In step 320, the computing system broadcasts the text data and the associated graphic.

If in step 308, the computing system determines that the specified disability type comprises a visual impairment disability then in step 324, the computing system removes the audible description data from the synchronized audio/video data. In step 328, the audible description data is synchronized with a graphic associated with the audible description data. In step 332, the computing system removes discontinuities between audible words in an audio portion of the synchronized audio/video data. The discontinuities are formed from removing the audible description data from the synchronized audio/video data. In step 334, the computing system broadcasts the synchronized audio/video data comprising the removed discontinuities.

Figure 4:
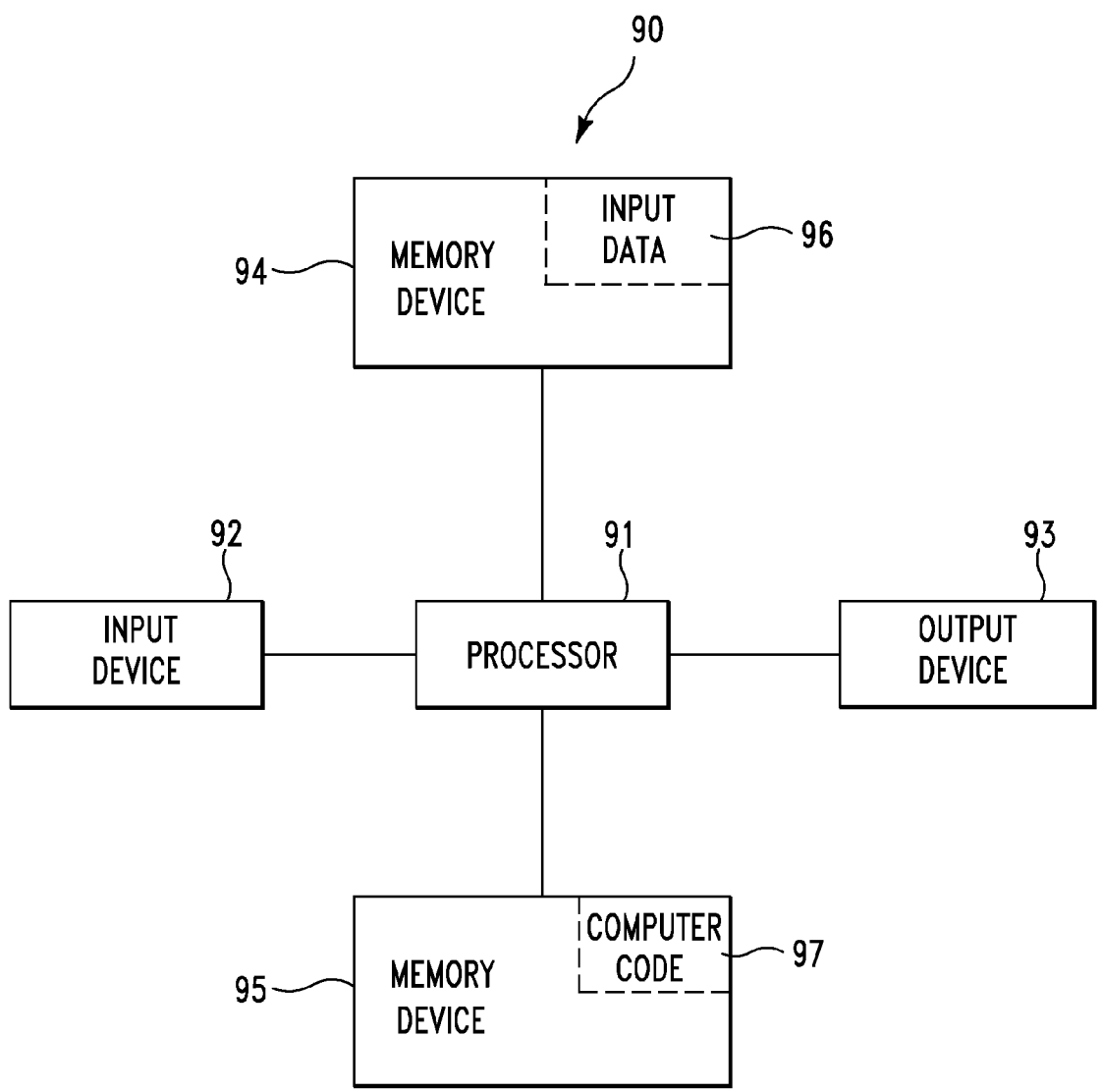
FIG. 4 illustrates a computer system used for generating and parsing verbal/text descriptions for specific graphics within video data, in accordance with embodiments of the present invention.

FIG. 4 illustrates a computer system 90 used for generating and parsing verbal/text descriptions for specific graphics within video data, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for generating and parsing verbal/text descriptions for specific graphics within video data (e.g., the algorithms of FIGS. 2 and 3). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers generate and parse verbal/text descriptions for specific graphics within video data. Thus the present invention discloses a process for deploying or integrating computing infrastructure, comprising integrating computer-readable code into the computer system 90, wherein the code in combination with the computer system 90 is capable of performing a method for generating and parsing verbal/text descriptions for specific graphics within video data. In another embodiment, the invention provides a business method that performs the process steps of the invention on a subscription, advertising, and/or fee basis. That is, a service provider, such as a Solution Integrator, could offer to generate and parse verbal/text descriptions for specific graphics within video data. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:
1. A method, comprising:
broadcasting, by a computing system, first audio data;
broadcasting, by said computing system, first video data associated with said first audio data, wherein said first audio data comprises audible descriptions for portions of said first video data;
determining, by said computing system, that said first video data comprises a first graphic, wherein said first audio data does not comprise a description associated with said first graphic;

after said determining, disabling by said computing system, said broadcasting first audio data and said broadcasting said first video data;
after said disabling, receiving by said computing system, audible description data associated with said first graphic;
generating, by said computing system, second audio data comprising said first audio data and said audible description data, wherein said generating said second audio data comprises inserting said audible description data into an associated portion of said first audio data; synchronizing, by said computing system, portions of said second audio data with associated portions of said first video data;
generating, by said computing system in response to said synchronizing, synchronized audio/video data comprising said portions of said second audio data aligned with said associated portions of said first video data;
broadcasting, by said computing system, said synchronized audio/video data;
disabling, by said computing system, said broadcasting said synchronized audio/video data;
determining, by said computing system, a specified disability associated with an audience for said synchronized audio/videodata; and
identifying, by said computing system, said audible description data within said synchronized audio/video data,
wherein said specified disability comprises a hearing impairment disability, and wherein said method further comprises:
removing, by said computing system in response to said identifying, said audible description data from said synchronized audio/video data;
after said removing, generating by said computing system, first text data associated with said audible description data;
synchronizing, by said computing system, said first text data with said first graphic; and
broadcasting, by said computing system, said first text data and said first graphic.

2. The method of claim 1, wherein said audible description data comprises a first language, and wherein said text data comprises a second language differing from said first language.

3. The method of claim 1, wherein said text data comprises a first language, and wherein said method further comprises:
converting, by said computing system, said first text data comprising a first language into second text data comprising a second language differing from said first language;
synchronizing, by said computing system, said second text data with said first graphic; and
broadcasting, by said computing system, said second text data and said first graphic.

4. The method of claim 1, further comprising:
generating, by said computing system, second text data from audio portions of said synchronized audio/video data, wherein said second text data does not comprise said first text data;
synchronizing, by said computing system, said second text data with associated portions of second video data of said synchronized audio/video data; and
broadcasting, by said computing system, said second text data with said associated portions of said second video data.

5. The method of claim 1, wherein said specified disability comprises a sight impairment disability, and wherein said method further comprises:
removing, by said computing system in response to said identifying, said audible description data from said synchronized audio/video data;
synchronizing, by said computing system, said audible description data with said first graphic; and broadcasting, by said computing system, said audible description data and said first graphic.

6. The method of claim 5, further comprising:
removing, by said computing system from said synchronized audio/video data, discontinuities between audible words in an audio portion of said synchronized audio/video data, said discontinuities formed from said removing said audible description data from said synchronized audio/video data; and
broadcasting, by said computing system, said synchronized audio/video data comprising said removed discontinuities.

7. The method of claim 1, wherein said identifying said audible description data comprises:
comparing, by said computing system, said second audio data with said first audio data.

8. The method of claim 1, wherein said first video data comprises a video slide show.

9. The method of claim 1, further comprising:
before said broadcasting said first audio data and said broadcasting said first video data, receiving, by said computing system via a network, receiving said first audio data and said first video data.

10. A process for supporting computer infrastructure, said process comprising providing at least one support service for at least one of creating, integrating, hosting, maintaining, and deploying computer-readable code in said computing system, wherein the code in combination with the computing system is capable of performing the method of claim 1.

11. A computer program product, comprising a computer readable storage device storing a computer readable program code, said computer readable program code configured to perform a method upon being executed by a processor of said computing system, said method comprising:
broadcasting, by said computing system, first audio data;
broadcasting, by said computing system, first video data associated with said first audio data, wherein said first audio data comprises audible descriptions for portions of said first video data;
determining, by said computing system, that said first video data comprises a first graphic, wherein said first audio data does not comprise a description associated with said first graphic;
after said determining, disabling by said computing system, said broadcasting first audio data and said broadcasting said first video data;
after said disabling, receiving by said computing system, audible description data associated with said first graphic;
generating, by said computing system, second audio data comprising said first audio data and said audible description data, wherein said generating said second audio data comprises inserting said audible description data into an associated portion of said first audio data; synchronizing, by said computing system, portions of said second audio data with associated portions of said first video data;
generating, by said computing system in response to said synchronizing, synchronized audio/video data comprising said portions of said second audio data aligned with said associated portions of said first video data;

broadcasting, by said computing system, said synchronized audio/video data, disabling, by said computing system, said broadcasting said synchronized audio/video data;

determining, by said computing system, a specified disability associated with an audience for said synchronized audio/video data; and identifying, by said computing system, said audible description data within said synchronized audio/video data, wherein said specified disability comprises a hearing impairment disability, and wherein said method further comprises:

removing, by said computing system in response to said identifying, said audible description data from said synchronized audio/video data;

after said removing, generating by said computing system, first text data associated with said audible description data;

synchronizing, by said computing system, said first text data with said first graphic; and broadcasting, by said computing system, said first text data and said first graphic.

12. A computing system comprising a processor coupled to a computer-readable memory unit, said memory unit comprising instructions that when executed by the processor implements a verbal description method, said method comprising;

broadcasting, by said computing system, first audio data;

broadcasting, by said computing system, first video data associated with said first audio data, wherein said first audio data comprises audible descriptions for portions of said first video data;

determining, by said computing system, that said first video data comprises a first graphic, wherein said first audio data does not comprise a description associated with said first graphic;

after said determining, disabling by said computing system, said broadcasting first audio data and said broadcasting said first video data;

after said disabling, receiving by said computing system, audible description data associated with said first graphic;

generating, by said computing system, second audio data comprising said first audio data and said audible description data, wherein said generating said second audio data comprises inserting said audible description data into an associated portion of said first audio data; synchronizing, by said computing system, portions of said second audio data with associated portions of said first video data;

generating, by said computing system in response to said synchronizing, synchronized audio/video data comprising said portions of said second audio data aligned with said associated portions of said first video data;

broadcasting, by said computing system, said synchronized audio/video data, disabling, by said computing system, said broadcasting said synchronized audio/video data;

determining, by said computing system, a specified disability associated with an audience for said synchronized audio/video data; and identifying, by said computing system, said audible description data within said synchronized audio/video data, wherein said specified disability comprises a hearing impairment disability, and wherein said method further comprises:

removing, by said computing system in response to said identifying, said audible description data from said synchronized audio/video data;

after said removing, generating by said computing system, first text data associated with said audible description data;

synchronizing, by said computing system, said first text data with said first graphic; and broadcasting, by said computing system, said first text data and said first graphic.

13. The computing system of claim 12, wherein said audible description data comprises a first language, and wherein said first text data comprises a second language differing from said first language.

14. The computing system of claim 12, wherein said text data comprises a first language, and wherein said method further comprises:

converting, by said computing system, said first text data comprising a first language into second text data comprising a second language differing from said first language;

synchronizing, by said computing system, said second text data with said first graphic; and broadcasting, by said computing system, said second text data and said first graphic.

15. The computing system of claim 12, wherein said method further comprises:

generating, by said computing system, second text data from audio portions of said synchronized audio/video data, wherein said second text data does not comprise said first text data;

synchronizing, by said computing system, said second text data with associated portions of second video data of said synchronized audio/video data; and broadcasting, by said computing system, said second text data with said associated portions of said second video data.

16. The computing system of claim 12, wherein said specified disability comprises a sight impairment disability, and wherein said method further comprises:

removing, by said computing system in response to said identifying, said audible description data from said synchronized audio/video data;

synchronizing, by said computing system, said audible description data with said first graphic; and broadcasting, by said computing system, said audible description data and said first graphic.

* * * * *